US006711492B1

(12) United States Patent
Pursifull et al.

(10) Patent No.: US 6,711,492 B1
(45) Date of Patent: Mar. 23, 2004

(54) OFF-LINE DIAGNOSTICS FOR AN ELECTRONIC THROTTLE

(75) Inventors: Ross D. Pursifull, Dearborn, MI (US); Edward A. Bos, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 12 days.

(21) Appl. No.: 10/247,029

(22) Filed: Sep. 19, 2002

(51) Int. Cl.[7] .......................... F16H 59/70; G06F 19/00

(52) U.S. Cl. .......................... 701/114; 701/115; 701/54; 123/399; 73/118.1

(58) Field of Search ................................ 701/114, 115, 701/29, 33, 35, 54; 123/399, 361; 73/117.3, 118.1

(56) References Cited

U.S. PATENT DOCUMENTS

| | | | | | |
|---|---|---|---|---|---|
| 4,541,378 | A | | 9/1985 | Kitamura | 123/397 |
| 5,083,541 | A | | 1/1992 | Chen | 123/339.17 |
| 5,115,396 | A | | 5/1992 | Keegan | 701/102 |
| 5,150,696 | A | | 9/1992 | Kabasin et al. | 123/680 |
| 5,307,776 | A | | 5/1994 | Unuvar et al. | 123/399 |
| 5,445,125 | A | | 8/1995 | Allen | 123/399 |
| 5,508,926 | A | * | 4/1996 | Wade | 701/29 |
| 5,521,825 | A | | 5/1996 | Unuvar et al. | 701/36 |
| 5,602,732 | A | | 2/1997 | Nichols et al. | 701/29 |
| 5,638,788 | A | | 6/1997 | Sanvido et al. | 123/339.2 |
| 5,720,258 | A | | 2/1998 | Tolkacz et al. | 123/352 |
| 5,746,174 | A | | 5/1998 | Abe et al. | 123/306 |
| 5,749,343 | A | | 5/1998 | Nichols et al. | 123/350 |
| 5,803,043 | A | | 9/1998 | Bayron et al. | 123/335 |
| 6,044,318 | A | | 3/2000 | Bourdon et al. | 701/65 |
| 6,263,856 | B1 | | 7/2001 | Weber et al. | 123/352 |
| 6,263,858 | B1 | | 7/2001 | Pursifull et al. | 123/399 |
| 6,273,061 | B1 | | 8/2001 | Hosoi | 123/333 |
| 6,295,967 | B1 | | 10/2001 | Weber et al. | 123/399 |
| 6,393,350 | B1 | * | 5/2002 | Light et al. | 701/54 |

* cited by examiner

*Primary Examiner*—Hieu T. Vo

(74) *Attorney, Agent, or Firm*—Brinks Hofer Gilson & Lione

(57) ABSTRACT

An engine diagnostic system is described in which a number of engine diagnostics for an electronic throttle are performed while the throttle itself is off line. Of particular interest are positional, electrical, and timing tests of performance for the electronic throttle. A number of self-diagnostic routines may be performed when the engine is off-line and the testing will not interfere with an operator of the engine or a motor vehicle containing the engine.

18 Claims, 7 Drawing Sheets

OFF-LINE DIAGNOSTICS FOR AN ELECTRONIC THROTTLE

FIELD OF THE INVENTION

This invention generally relates to control and diagnostic systems for internal combustion engines, and more particularly to engines having a powertrain control module and a motorized module, such as an electronic throttle.

BACKGROUND OF THE INVENTION

In a modern automobile or truck with an internal combustion engine, there is typically a powertrain control module (PCM) which governs almost all important operating and safety features related to the vehicle powertrain. Certain functions of the PCM are more important than others, such as controlling an engine's fuel, air and ignition. Therefore, the PCM incorporates a number of diagnostic elements and procedures for insuring proper functioning of the engine. These tools include self-diagnostic routines and procedures.

The diagnostic routines and procedures should be as automatic as possible and should be minimally-intrusive. That is, if the PCM routinely performs self-diagnostic procedures on a fuel system or air system, the procedures should not intrude on driver-commanded engine performance, and certainly should not intrude on vehicle operation. For instance, it may be desirable for the PCM to exercise a throttle valve in order to check actual position against intended position in the throttle body, or it may be desirable to measure throttle motor torque or current to determine whether the throttle control valve is stuck or is operating properly. Tests for these characteristics should not be run while the vehicle using these systems is operating, since performing the test may be inconsistent with operating the vehicle in the manner the driver requires. That is, operating the test while the vehicle is running could interfere with the operation or safety of the vehicle.

What is needed is a way to perform engine diagnostics, and in particular throttle diagnostics, while the vehicle or engine is not in operation. What is needed is a way to run engine and throttle diagnostics while the vehicle or engine is off-line.

SUMMARY

One aspect of the invention is an engine diagnostic system. The engine diagnostic system comprises a powertrain control module and an electronic throttle operably connected with the powertrain control module. The system also comprises at least one sensor for indicating a parameter of the electronic throttle and an output for indicating a result, wherein the powertrain control module performs at least one test of at least one parameter of the electronic throttle when the electronic throttle is off-line. Another aspect of the invention is a method of diagnosing an electronic throttle connected to a powertrain control module of an internal combustion engine. The method comprises waiting for a period of time when the electronic throttle is off-line, and then testing the electronic throttle for at least one parameter of performance of the electronic module. The method also includes outputting at least one result of the test.

Another aspect of the invention is an off-line vehicle diagnostic system. The system comprises an electronic throttle of the vehicle, and a powertrain control module operably connected with the electronic throttle. There is at least one sensor for indicating a parameter of the electronic throttle, wherein the powertrain control module performs at least one test of at least one parameter of the electronic throttle when the electronic throttle is off line, and outputs a result of the at least one test.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PRESENTLY PREFERRED EMBODIMENTS

The off-line diagnostic system can be used in vehicles, such as automobiles and trucks, and especially internal-combustion vehicles. However, the diagnostic systems described and claimed herein may also be used in electric hybrid vehicles, such as those employing both internal-combustion and electric means of propulsion. The diagnostic system is most advantageously used with a motorized throttle of such vehicles.

Figure 1:
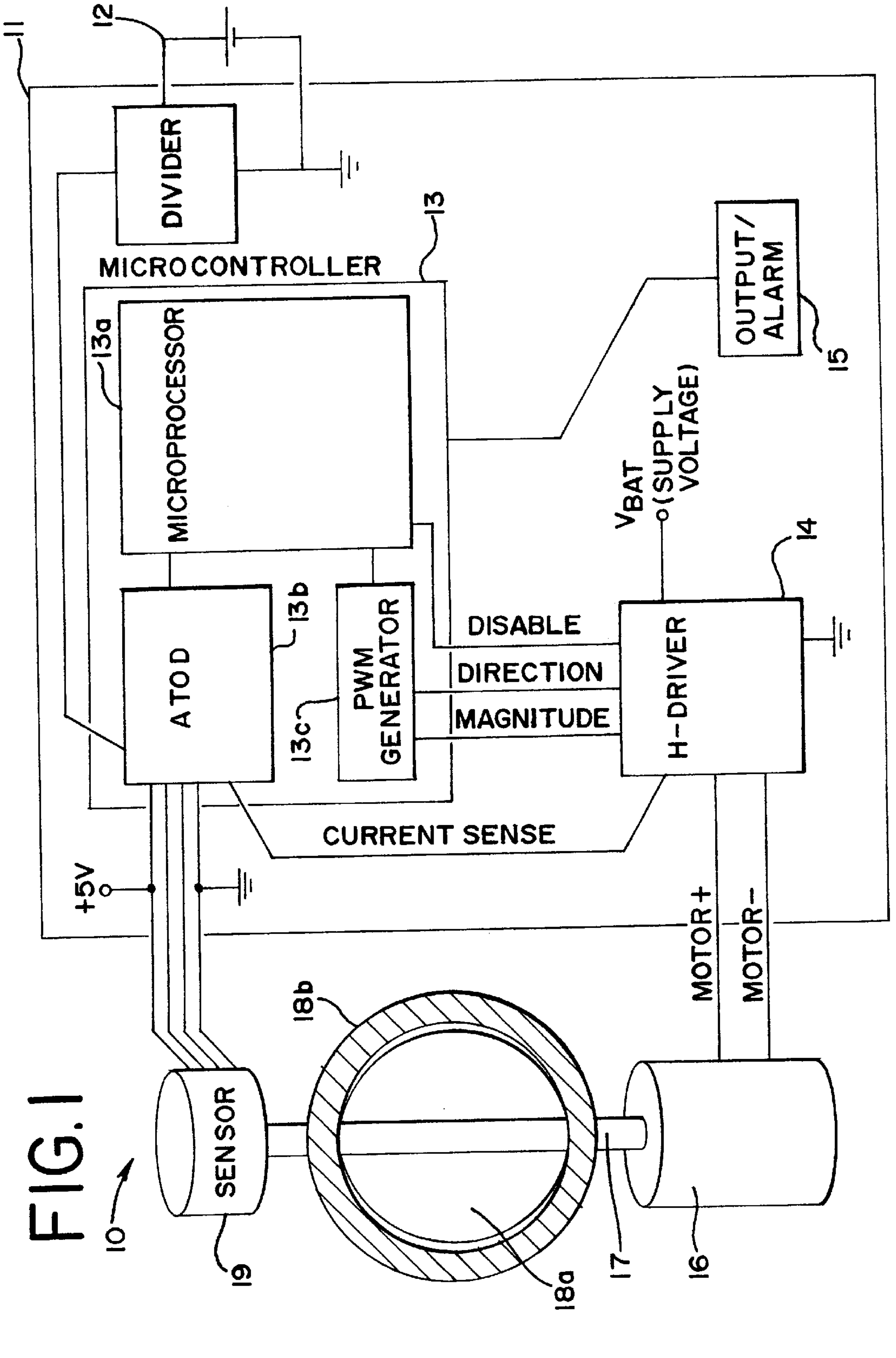
FIG. 1 represents a block diagram of an electronic throttle with a powertrain control module.

One such subsystem is a motorized throttle of a passenger vehicle. FIG. 1 depicts a block diagram of an electronic throttle with a powertrain control module 10. The assembly includes a powertrain control module 11, and a microcontroller 13 with a microprocessor 13*a* having a memory or storage capability. The microcontroller 13 preferably also includes an analog-to-digital converter 13*b* and a pulse-width-modulation (PWM) generator 13*c*. The microcontroller outputs an alarm or signal that a result of a diagnostic test was out-of-limits or otherwise indicated a failure. The output may be a signal light or a sound, or may simply be a test value or test indication stored in the microprocessor. The test value or test indication preferably is available for reading by a mechanic or technician servicing the vehicle.

The PWM generator 13*c* drives an H-driver 14 which in turn drives the throttle motor 16. A disable line also connects the H-driver to the microprocessor, and a current sense line may provide feedback from the H-driver to the analog-to-digital converter (ADC) 13_b_ and microprocessor 13_a_. The throttle also includes a throttle shaft 17 and a throttle plate 18_b_ moving in throttle body 18_a_ as throttle shaft 17 turns. There is also a throttle plate position sensor 19 and a power source 12, such as a vehicle battery. A result of a diagnostic test performed by the system may be output by the output/alarm device 15 or may reside in the memory of the microprocessor 13_a_. For serious defects or faults, the diagnostic system may output the result by means of a light on an instrument panel of the vehicle, or by sounding an alarm, printing a result of the test, or voicing a warning. For less serious results or for easy readout of a test result, the result of the diagnosis may be printed or stored in a memory of the microprocessor, or in another memory, such as a built-in-test module or other convenient storage and readout device.

Figure 2:
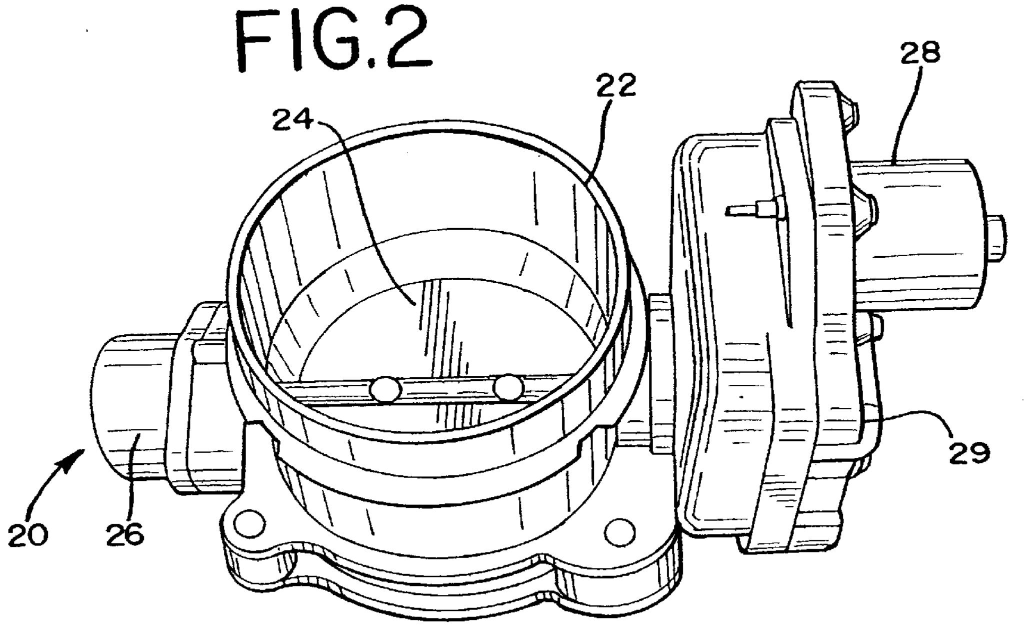
FIG. 2 is a perspective view of an electronic throttle for an engine.

The throttle is depicted in greater detail in FIG. 2. Throttle 20 has a throttle body housing 22 and a throttle plate 24, which corresponds to the butterfly in a butterfly valve. The throttle also has a position sensor 26, such as an encoder, for determining and feeding back the position of the throttle plate 24 to the powertrain control module. The electronic throttle also has a motor 28 for moving or rotating the throttle plate to a desired position. The motor 28 may move the throttle plate or butterfly through a geartrain 29. By moving the throttle plate to a more open or to a more closed position the throttle controls the flow of air to the intake manifold of the engine. Thus, the throttle controls the amount of air received by the intake manifold and the cylinders of the engine, and thus significantly contributes to control of vehicle speed, slowing or accelerating as desired.

In order to understand the diagnostics that may be performed off-line for the electronic throttle, it may be helpful to briefly discuss the workings of this typical motorized electronic module. An electronic throttle is motorized because it operates by means of a motor which is mounted to the throttle body. The motor moves in response to commands from the powertrain control module, the motor moving the throttle plate by rotating the throttle plate through a geartrain or power transmission assembly, which typically converts many revolutions of the motor to only a small portion of a revolution on the throttle plate, typically 90°. As mentioned above, the electronic throttle may also have a position sensor for feedback of its position to the powertrain control module. The throttle also typically has a torsion spring opposing throttle motor torque. Operation of the motor may involve many parameters that are measurable, such as current and voltage to the motor, force needed to overcome the spring torsion, angular position, the time used to perform a particular operation, and so forth.

It should be clear that it is undesirable to exercise the throttle module, for purposes of throttle actuation diagnosis, and particularly the throttle plate, while the vehicle or even the engine is in service or "on-line." For instance, if the operator or the diagnostic system has a question about the "stickiness" of travel of the throttle plate, it would not be prudent to take the throttle "off-line"for testing while the vehicle is in service, for instance, while traveling from one point to another. It may be inadvisable to exercise the throttle even while the vehicle is stopped with the engine running, if the exercise would interfere with another function or would cause inconvenience to an operator or other person working with the engine.

Figure 3:
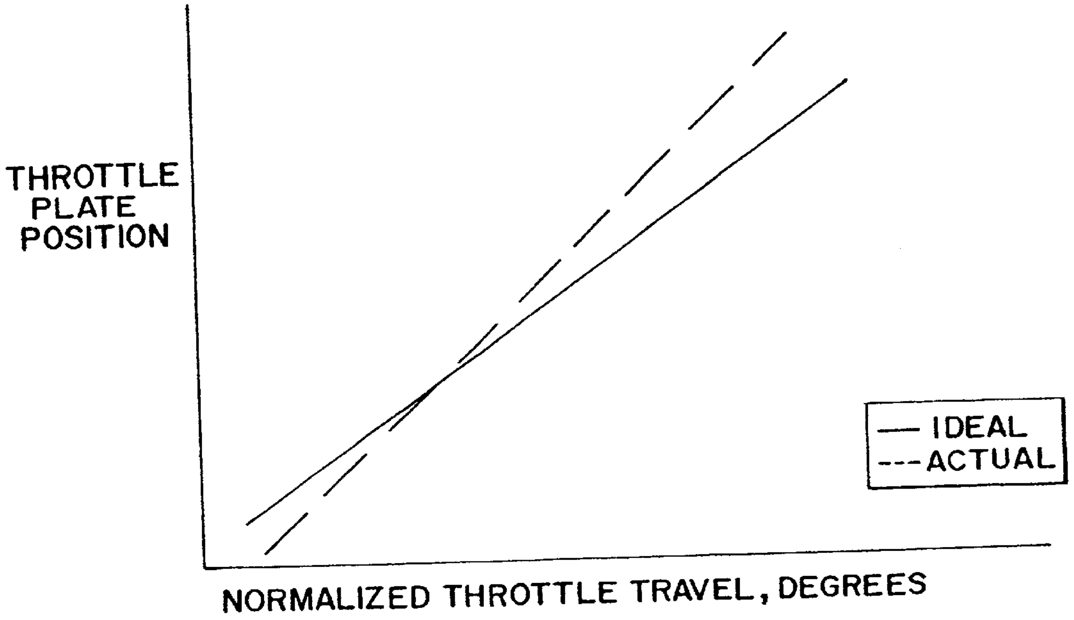
FIG. 3 is a chart showing a possible correlation between the throttle plate position and an indicated sensor reading of the throttle plate position.

One such test that would desirably be performed off-line is a test for the position of the throttle plate in relation to the expected distance traveled by the throttle plate. FIG. 3 illustrates one run of such a test, which plots throttle position versus travel expected based on the number of turns of the motor. The solid line depicts the expected travel over some range, while the dotted line may indicate feedback from the electronic throttle position sensor. There may be reasons for deviation from the ideal plot, and there may be a range of acceptable position sensor values that correspond to the motor rotation.

Figure 4:
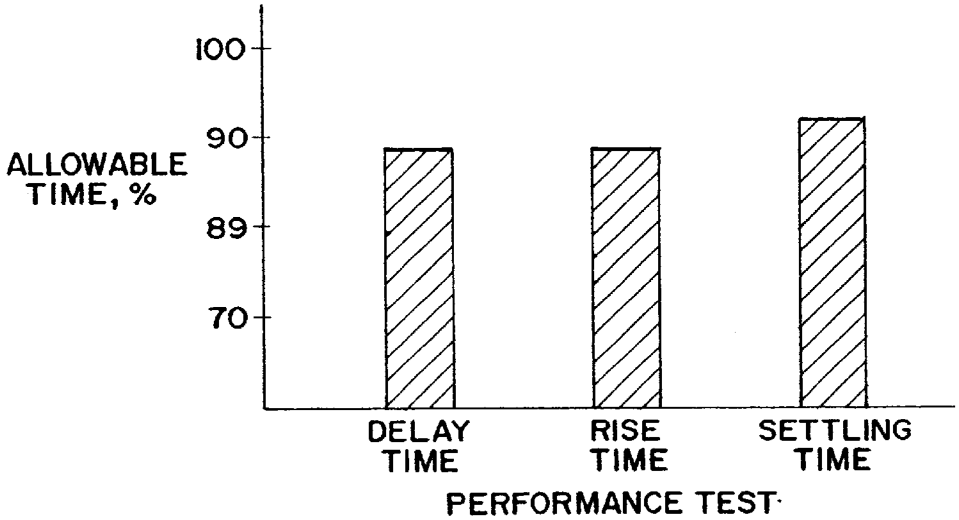
FIG. 4 is a chart indicating performance of the throttle plate for several time parameters.

FIG. 4 depicts another possible test that would preferably be performed off-line, such a timed parameter. In FIG. 4, the time for performance of a particular task is plotted, such as throttle delay time. In one embodiment, throttle delay time may be defined as the time to rotate the throttle plate from 2 degrees to 10 degrees. A standard time for this movement may be 10 milliseconds, measured by timing derived from microcontroller 13. Comparing the actual time for this movement to the 10 millisecond standard may show a discrepancy that exceeds a threshold. This discrepancy would be flagged as an issue. The other measurements may have other definitions and standards. The diagnostic system may provide outputs of these test results.

A non-exhaustive list of tests that an off-line diagnostic system could perform includes checking that throttle plate position matches throttle plate command at a number of points, throttle return time (normal, with H-driver high output resistance), throttle return time (H-bridge disabled, with H-driver low output resistance), H-bridge enable/disable working, current limit, current sense offset, motor resistance, inferred motor temperature from motor resistance, throttle plate stuck, ice formation, stop position repeatability, spring force (at several positions), hysteresis, stop compliance, system transfer function, broken or missing spring, detect plunger jammed open, detect plunger jammed closed, check whether open stop is clear of wide-open-throttle position, current sense zero when duty cycle command is zero, verify throttle plate sensor slope ratio, verify sensor knee location, check maximum sensor disagreement at steady state, check maximum sensor disagreement at high speed, throttle plate positional noise, check throttle plate velocity with small and large step changes (maximum velocity), measure time for throttle plate command change from 2 degrees to ten degrees (delay time), measure time for command change from ten degrees to seventy-four degrees (rise time), measure time for change from ten degrees to within settling band from 81.5 to 82.5 degrees (settling time), speed from 81 degrees to 82 degrees (approach speed) and an open loop position test. A number of similar tests may also be performed for closing the throttle plate, such as closing from a full open position (about 82 degrees).

Many of these tests are desirably performed at frequent intervals, but require far too much time during the brief period between the time a driver of the vehicle turns the vehicle key on and the time the engine starts. Other periods of time when the powertrain control module is available for off-line testing include: a production period of the vehicle; a time shortly after the vehicle is turned off, and the engine is therefore off (known as PCM power sustain after key-off); some time after key-off (known as PCM wake-up); shortly before key-on (vehicle door switch begins PCM power-up); and during periods when the throttle pressure drop is very low. High manifold pressure exists when the difference between the upstream pressure and the downstream pressure, i.e., between atmospheric pressure and the intake manifold, is very low. Off-line diagnostics may be run during any or all of these off-line periods.

EXAMPLES

Throttle Return Time

An example of a test and a procedure for executing the test is given for throttle return time. Federal motor vehicle safety standards require that if the electronic throttle motor fails, the return spring must be able to position the throttle to a default position within a specified time limit. A test to determine the performance time of a given throttle would be impractical during operation of the motor vehicle containing the throttle, so off-line testing may be a good option for this test. One embodiment of a test according to the present invention would include steps of positioning the throttle to an extreme open position, electronically disconnecting the motor from its power source (i.e., "open motor"), and measuring the time from "open motor" to throttle default position, using throttle plate position sensor 19 and timing derived from microcontroller 13. The test would then compare the measured time with the maximum allowed time, and indicating a failure and outputting a failure signal if the measured time exceeds the allowed time. In vehicles using a shorted motor condition rather than an open motor condition to test for a failure mode, the motor is shorted (electronically), and the time is measured from that point.

Stuck/Obstructed Throttle

A stuck or obstructed throttle can be detected off-line without having to consider operating consequences of throttle position. A method for checking for stuck or obstructed throttle includes steps of commanding a throttle position of near close stop (throttle almost closed), and waiting a short interval of time (e.g., 200 ms). The method then includes verifying with the throttle position sensor 19 that the absolute value of position error is less than a given value (e.g., about 1/16 of a degree). The method then includes commanding a throttle position near open (throttle almost wide open), and waiting a short period of time (e.g., 200 ms). The method then includes verifying that the absolute value of throttle position error is less than a given value (e.g., 1/16 of a degree). The method then indicates a failure if the position error exceeds the allowable error, and outputs a failure signal if the measured error exceeds the allowed error.

Ice Formation

Ice can form in a throttle body during engine operation and while the engine is off. At least two embodiments of a test for ice formation are possible according to the method. In a first embodiment, at key-on, the throttle is driven to close stop by applying a closing voltage to the throttle motor 16 for a given time period. The throttle position sensor 19 reading is then recorded. The method then compares the present throttle position sensor reading to see if the throttle is significantly more open than it was during the previous operation of the throttle. In one embodiment, this would preferably mean searching for a deviation greater than about 1.5 degrees. Other standards may be used. If the throttle position is significantly more open than it was previously, ice may have formed. The method then includes indicating a failure condition and outputting a signal indicative of a failure condition. A second embodiment of the method may be performed after key-off. The throttle is driven to a close stop position by applying a closing voltage to the throttle motor 16 for a given time period. The method then includes comparing the present throttle position sensor 19 reading to see if the throttle is significantly more open than it was during key-on. The method then includes indicating a failure condition and outputting a signal indicative of a failure condition.

Current Limit

The H-driver in the throttle motor electronics is designed to operate the motor within current limits, e.g. 0–5 amps, and to limit motor current to a specific standard value, e.g. a particular value in the range of 5–8 amps. One embodiment of the method is a process to check the current needed to operate the throttle motor while off-line. The test may be applied to open or to close the throttle. One embodiment of the method includes applying a closing voltage to the motor, and waiting a period of time, e.g. 50 ms). The method then includes measuring the absolute value of motor current, for instance with an integration function of the electronic throttle electronics. The method then includes comparing the measured value with the standard. If the motor current exceeds the maximum standard value, the method then indicates the failure and outputs a signal indicative of the failure. If the motor current is less than the standard minimum value, the method then indicates the failure and outputs a signal indicative of the failure. The output and the signal may be specific ("throttle current over maximum" or "throttle current below minimum"), or may be general ("throttle current out of limits"). A similar test may be run to test for current limits upon opening the throttle. If the current limit test is combined with other tests, the indicated failure or the output signal may be even more specific, e.g. "motor resistance too low." A similar test may be run to test for current limits upon opening the throttle.

Current Sense Offset

The electronic throttle module senses throttle plate motor current by generating a current of about 1/400 the actual motor current (a current mirror) and passing this small current through a resistor, generating a voltage indicative of motor current. This current sense is done by an H-driver in the module. The voltage is "read" by a microprocessor in the electronic throttle module. If the throttle motor is not energized, the actual motor current is therefore zero, and a failure of this current sense is indicated by having an "offset" current. To test for an offset current, zero voltage is applied to motor terminals. A short period of time is waited, about 50 ms. Motor current is then measured, and if it exceeds a predetermined value, such as 0.05 amps, an offset current may exist. The module may then indicate a fault, and a signal indicative of a fault may be output.

Throttle Plate Positional Noise

The position of the throttle plate may oscillate or vary due to one or more adverse factors. These variations may have high frequency or low frequency. To check for positional noise, a test may be run off-line using the throttle plate position sensor 19 or other instrument, such as an encoder, to see if throttle plate wiggle exceeds a predetermined standard, such as a computed standard deviation. In one embodiment, a standard deviation threshold is about 0.050° (about 3 minutes of a degree). If the wiggle is higher than the standard, a fault condition may exist. For instance, a low frequency oscillation may indicate friction. An alarm or fault signal may then be output.

Stop Compliance

Figure 5:
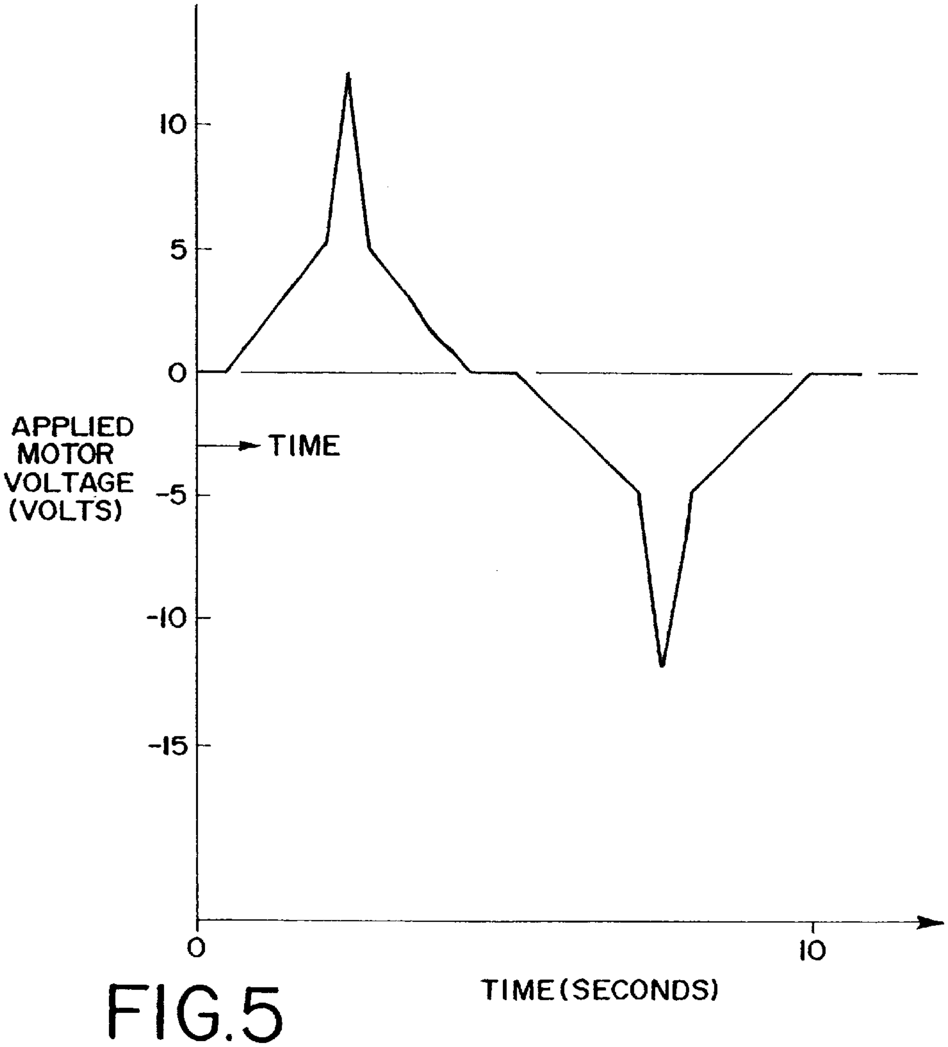
FIG. 5 is a graph of an input voltage waveform for an open loop test

Stop compliance is a test that is performed to determine the "stiffness" of the throttle position once a full-open position is reached. FIG. 5 depicts a time-voltage graph of a stop compliance test. A ramped voltage is applied from about 0 to 5 volts to energize the throttle motor and drive it to a full open position. At that point a sharply ramped voltage from 5 to 12 volts and then back to 5 is briefly applied, and then the voltage is then ramped back to zero. During this time, the position sensor 19 notes the position of the throttle plate, which, in this example, should be at a full-open stop at about 5 volts. Stop compliance is the ratio of the incremental voltage that is then applied (7 additional volts) divided by the change in position of the throttle plate, say about 0.1°. In this example, stop compliance would be 70 V/degree, a desirably high value. As shown in FIG. 5, the test may be repeated in the opposite direction, running to full closed stops, and applying the voltage. A stop compliance less than a set standard may suggest a problem in holding position, and an alarm or fault indicator may then be output. Volts are measured with the electronics and functions of the microcontroller 13.

Hysteresis

Figure 6:
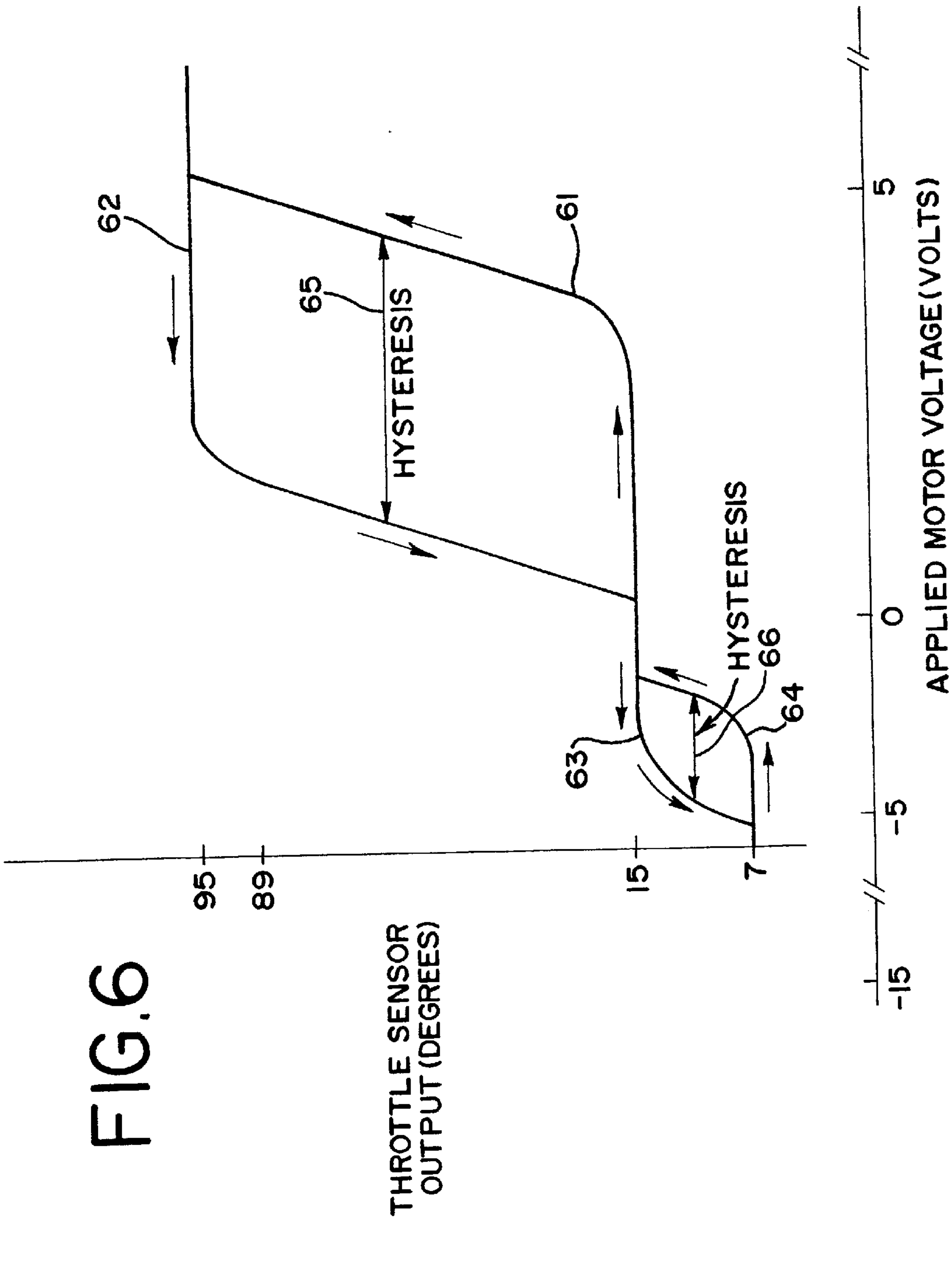
FIG. 6 is a graph of an open-loop test depicting hysteresis as a result of the voltage input from FIG. 5.

Hysteresis in a graph of motor voltage against throttle position is another way to measure friction or stickiness in throttle movement. FIG. 6 depicts a hysteresis test in which a voltage of about +5 volts is applied in a positive direction, trace 61, to open the throttle and then ramped backward, trace 62. The curves do not overlap, indicating that there is a different throttle position, measured by the throttle plate position sensor 19, depending on whether the voltage is rising or falling. Hysteresis is measured in volts and is indicated in the right hand portion of the graph by hysteresis distance 65, suggesting some measure of friction. Hysteresis testing may also be performed in the opposite direction, applying negative volts to close the throttle. Negative voltage is applied per trace 63 and then reversed per trace 64. The hysteresis in this portion of the graph is much smaller, hysteresis distance 66, suggesting that there is little friction in this portion of throttle body travel. As with other tests, a hysteresis test result in excess of a set standard may indicate a fault, and an alarm or indication of a fault may be output.

Open Loop Test

An open loop test may be run to chart throttle position against applied motor voltage. The test may be run in any of several manners, so long as the test includes applying zero voltage, ramping to full open position, ramping to zero voltage, ramping to full closed position, and then back to zero voltage. The entire test is desirably run off-line, and should take about 10 seconds. A longer or shorter time period may be used. Running the test as shown reduces the influence at the back emf. While the voltage is being ramped, the throttle position sensor 19 records throttle position. If this test is being run during production, a high-accuracy encoder may also be used to record throttle position. Throttle performance may be compared or "graphed" by plotting applied motor voltage and throttle position sensor (TPS) outputs against throttle position. Specific data points that may be checked and compared to desired or predetermined values include stop compliance, volts to open, volts to close, voltage difference from default to close, voltage difference from default to open, hysteresis above default, hysteresis below default.

One method of determining localized frictions in the mechanism is to use an algorithm which will be described here. A throttle plate is moved from a default position (zero volts) to a closed position, then to an open position, then to the default position (zero volts), and then to a closed position, and then to a default (zero volts) position. A "best fit" line is calculated for the movement in the opening direction and also in the closing direction, and will desirably be calculated from about 10 to about 85 degrees. These "best fit" lines then form a body of data points known as "corrected voltage," for opening and closing directions. The voltage data recorded is known as "terminal voltage," again in both opening and closing directions. According to the method, and beginning at 14 degrees for the opening data, a quantity of corrected opening voltage minus the associated terminal opening voltage is computed for 9 integral angles, for angles 10, 11, 12, 13, 14, 15, 16, 17 and 18 degrees, that is, for 14 degrees ±1, 2, 3 and 4 degrees. Each of the nine quantities must be positive or zero; if any particular quantity is less than zero, a zero is used instead. All nine quantities are summed and then saved. This process is then repeated for each angle from 15 to 81 degrees. The resulting array of sums is termed A(x). Each term in the array may be indicative of relative local friction in the opening mode.

For the closing data, the best fit line is also calculated and is termed the "corrected closing voltage," while the data points as recorded are termed the "terminal closing voltage." According to the method, and beginning at 14 degrees for the closing data, a quantity of corrected closing voltage minus terminal closing voltage is computed for 9 integral angles, for angles 10, 11, 12, 13, 14, 15, 16, 17 and 18 degrees, that is, for 14 degrees ±1, 2, 3 and 4 degrees. Each of the nine quantities must be positive or zero; if any particular quantity is less than zero, a zero is used instead. All nine quantities are summed and then saved. This process is then repeated for each angle from 15 to 81 degrees, for the closing data. The resulting array of sums is termed B(x). Each term in the array may be indicative of relative local friction in the closing mode.

Figure 7:
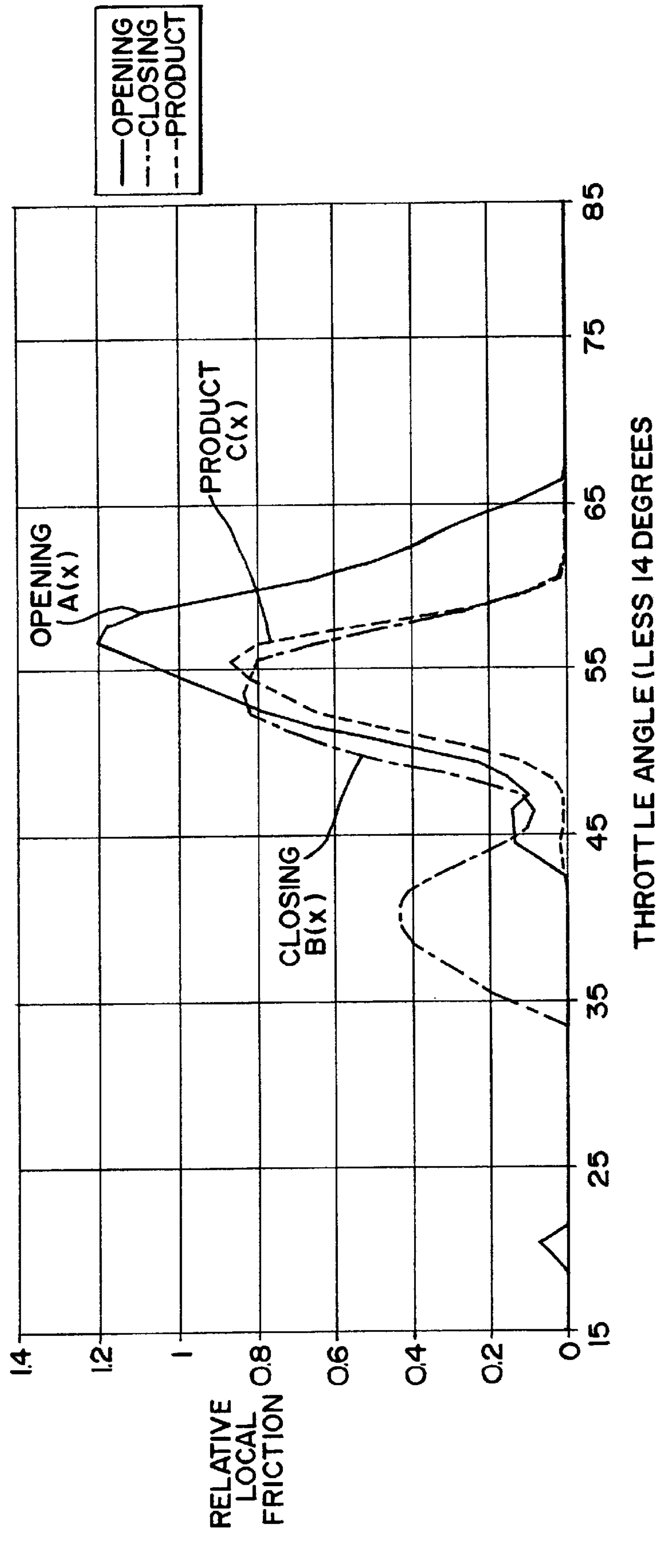
FIG. 7 is a graph depicting the result of an open loop position test.

The method then multiplies arrays A(x) and B(x) for every angle from 14 to 81 degrees, forming a third array, C(x). Each term in this array may be indicative of relative local friction in both opening and closing modes. The array is then compared to a predetermined value to determine whether the throttle plate is positioning correctly. In calculating the third array, a term for any given angle in C(x) will only have a positive value if both of the first two arrays have a positive value. This would suggest that there is sticking at the same angle. FIG. 7 graphs a typical result, in which the sums of the arrays are graphed, with the sums termed "relative local friction," and are graphed against the angles for which they were calculated. FIG. 7 suggests there may be sticking at about 55 degrees. The graph also shows that the values of the product of the two arrays, C(x), tends to be less than the values of either of arrays A(x) or B(x). This algorithm thus tends to minimize "false alarms." Only when the product value is greater than a predetermined value is a fault condition noted, and an indicator of a fault may then be output. In this example, if the predetermined maximum is greater than 1.0, a sticking condition may be indicated and a fault alarm output.

Stop Position Repeatability

Three separate tests may be run, for close stop position, default position and open stop position. To perform a close stop test, the method used is to apply full closing voltage, wait for at least 150 ms for the throttle plate to reach close stop, and then measure the output of the throttle position sensor 19, and verify that each sensor is within a predetermined acceptable range. To run a test for default position, zero voltage is applied, and a waiting period is again allowed. Then the throttle position sensor output is measured. If the sensor output is within a predetermined acceptable range, then the sensor is functioning properly. For an open stop test, full opening voltage is applied, and a wait period is observed, for about 150 ms to 200 ms or more. The throttle position sensor output is measured and compared to a predetermined acceptable range. In all three tests, a result that is outside the acceptable ranges may indicate a fault, and an alarm or a fault result may be output. This test may also be used to chart sensor performance and to verify correct throttle plate sensor performance.

Spring Force

The spring that returns the throttle to its default position from a more open position or a more closed position may also be checked for spring force. The spring force may vary due to manufacturing variations or from extended service of the spring. A test for spring force may be run by moving the throttle plate to a given position and noting the motor effort required to hold it there. A method would include a step of positioning the throttle plate to at least one known position using the throttle plate position sensor 19, and measuring the force required to hold it there. The force is measured by at least one of motor current or motor voltage, using electronics from the microcontroller 13. If the current or voltage or force is out of a predetermined range, a fault may be indicated. For example, a broken spring would require almost zero effort to hold any given throttle plate position. An alarm or fault message may then be output.

High Throttle Pressure

If the throttle is not controlling air flow, it may be positioned for diagnostic purposes. When the pressure upstream of the throttle (near atmospheric) is very close to the pressure downstream of the throttle (intake manifold pressure), the throttle and the throttle plate has no significant influence on air flow rate. In these circumstances, there is little pressure drop across the throttle, and it would be more accurate to speak of a low pressure drop across the throttle than to speak of a "high intake manifold pressure." A low pressure drop may exist under many conditions, including very high speeds and very low speeds.

Figure 8:
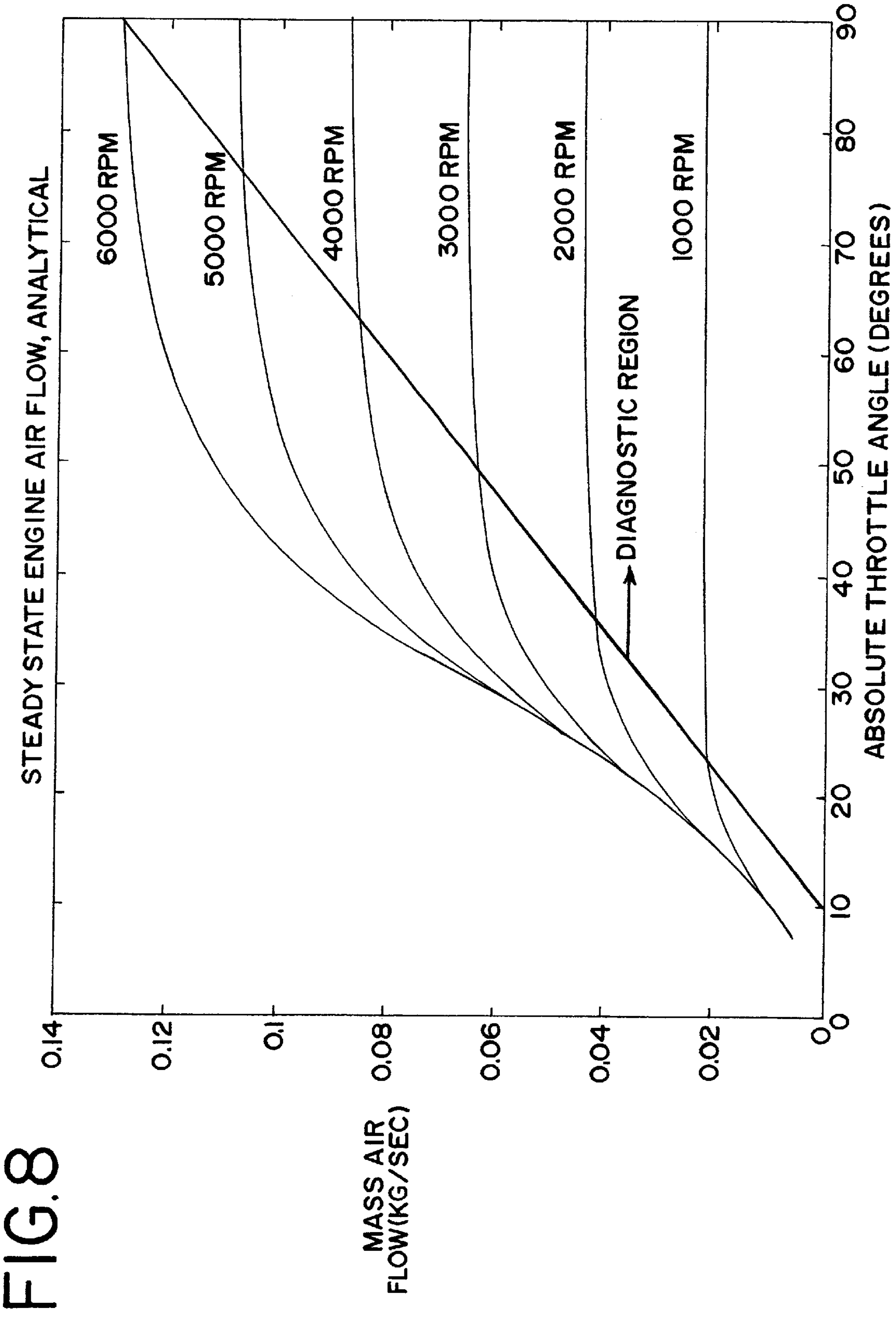
FIG. 8 is a graph depicting the region where the throttle does not control airflow.

When the engine speed is near zero, the pressure drop across the throttle is very low, close to zero, and the motorized throttle may be used for diagnostic purposes. For instance, during an acceleration from a stop, the engine speed can be relatively low and the throttle angle may be such that the manifold pressure is very close to atmospheric, with a very low pressure drop across the throttle. When the engine and throttle are running wide open, the pressure drop across the throttle may also be close to zero, and the throttle may be available for diagnostics. FIG. 8 depicts throttle performance, graphing throttle angle (throttle plate position) against mass flow of air. Performance is graphed for a number of engine speeds from 1000 rpm to 6000 rpm. In one embodiment, the region to the right of the diagonal line is a performance region of low pressure drop or high intake manifold pressure, in which the throttle may be available for at least some diagnostic tests that do not interfere with throttle performance. In other words, the diagnostic system may run tests which do not interfere with airflow or pressure drop, but which may alter throttle plate position in a manner that does not interfere with throttle or engine performance.

Motor Resistance Check

Another embodiment of the method is to check for a full or partial short in the throttle motor, which can degrade throttle positioning performance. Motor resistance may be tested off-line to see if it is within a desired range, and temperature compensation may be applied to insure the validity of the test. Electronic circuits within the microcontroller 13 may perform the test. One embodiment of the method is to apply a given, measured voltage to the motor coil. The voltage is preferably in the millivolt range, so that the throttle will not move and the coil will not heat up. The method includes measuring the current resulting from the application of the voltage, and then calculating the resistance of the combined motor, wire leads, and drive electronics. The method then compares the calculated resistance to a desired minimum and maximum value for the resistance. If the measured value is greater than the maximum value or less than the minimum value, the method then indicates a fault and outputs a signal indicative of the fault. Temperature compensation algorithms may be used to adjust the minimum or maximum value, if the throttle or throttle motor has a temperature sensor and can indicate a temperature to the throttle electronics. Another embodiment drives the throttle plate against a stop so that the voltage applied is near full-voltage, thus using a larger voltage and possibly gaining a more accurate measure.

H-Bridge Enable

The H-bridge enable test is run to determine whether the throttle plate moves when the electronics have been electronically disabled or disconnected. A complementary test is then run to enable or reconnect the electronics, and see whether the throttle plate does move. In one step of the test, the throttle motor drive is disconnected. A second step commands the H-driver 14 to apply full opening or closing voltage. Of course, since the motor drive was electronically disconnected, no movement should be possible. The throttle position voltage is then compared to a predetermined default position by checking the position sensor 19. If there is a significant difference, a failure is indicated and a fault message or alert may be output.

Figure 9:
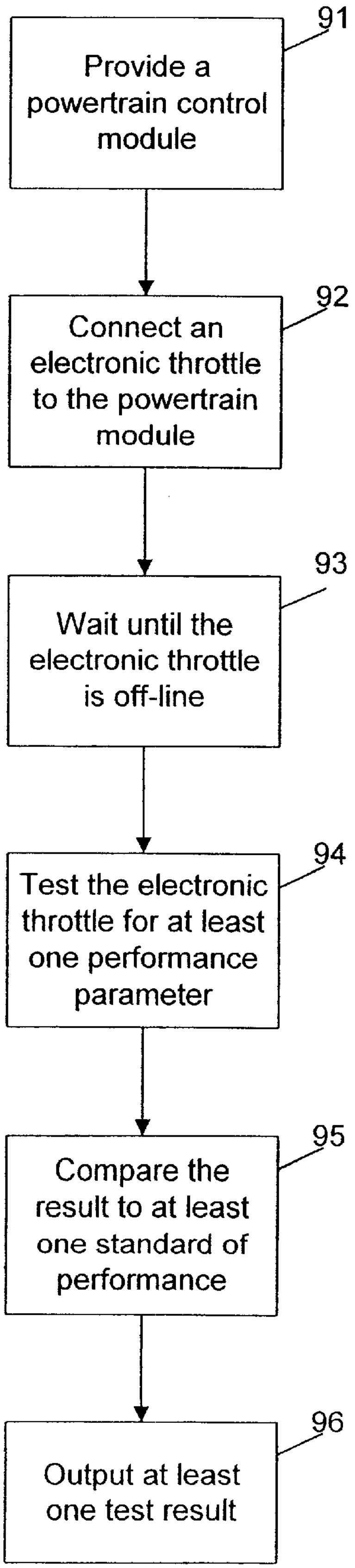
FIG. 9 is a method for diagnosing an electronic throttle of an internal combustion engine while the module is off-line.

FIG. 9 depicts a method for diagnosing an electronic throttle while the throttle is off-line. The first step 91 of the method is to provide a powertrain control module for a motor vehicle. The second step 92 is to connect an electronic throttle to the powertrain module. The next step 93 is to wait until the electronic throttle is off-line before attempting diagnostics. When the electronic throttle is off-line, the method then comprises testing 94 the electronic throttle for at least one performance parameter. The method then compares 95 the result of the test to at least one standard of performance, such as an expected time or force to complete a task. The method then outputs 96 the result of the at least one test.

There are other periods of time for when diagnostics are desirably run. These periods include test periods during the manufacturing process, also known as end-of-line testing, testing by a service technician, and in general, testing performed at any time when the powertrain control module or the electronic throttle control is powered but is not in control of engine power, including on-board diagnostics. These periods of time may be signaled by a technician having access and input to the powertrain control module, such as entering a code that disables engine power during the testing or diagnostic routine.

In other periods of time, a "smart" powertrain control module can exercise off-line diagnostics when the engine or vehicle key is "off" by supplying power to the module for testing and diagnostics only. This may be accomplished by designing the powertrain control module power supply so that power is supplied to the module for an extended period after "key-off." This may be accomplished by a timer or by simply enabling power to the desired components at all times, even after "key-off." Safety may be assured by enabling diagnosis for only one module at a time, or other design to insure that only diagnostics, and not operations, are performed during these periods. For instance, the starter function may not be enabled without full "key-on."

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A vehicle diagnostic system comprising:

an electronic throttle;

a powertrain control module operably connected with the electronic throttle;

at least one sensor for indicating a parameter of the electronic module, wherein the powertrain control module performs at least one test of at least one parameter of the electronic throttle when the electronic throttle is off line and outputs a result of the at least one test.

2. The diagnostic system of claim 1, wherein the electronic throttle is off-line during at least one of a production period, a power-down period, and a period when the engine is off.

3. The diagnostic system of claim 1, further comprising a memory containing a software program for conducting the at least one test, the memory operably connected to at least one of the powertrain control module and a service technician's powertrain control module diagnostic tool.

4. The diagnostic system of claim 1, wherein the test is selected from the group consisting of an open loop position test, a throttle step response test, a stop position repeatability test, a stop compliance test, a positional noise test, a current sense test, an H-bridge enable test, a hysteresis test, a current limit test, a motor resistance check, a sweep test, a range of motion test, a spring/motor force test, a test for positional noise, a test for high friction, a test for ice formation, a throttle-stuck test, and a throttle return timing test.

5. The diagnostic system of claim 4, wherein the timing test is selected from the group consisting of a delay time, a rise time, a settling time, a travel time, and an approach time.

6. An engine diagnostic system, comprising:

a powertrain control module;

an electronic throttle operably connected with the module;

at least one sensor for indicating a parameter of the electronic throttle; and an output for indicating a result, wherein the powertrain control module performs at least one test of at least one parameter of the electronic throttle when the electronic throttle is off-line.

7. The engine diagnostic system of claim 6, wherein the throttle is off-line during at least one of a production period, a power-down period, a period of low throttle pressure drop, and a period when the engine is off.

8. The engine diagnostic system of claim 6, further comprising a memory containing a software program for conducting the at least one test, the memory operably connected to at least one of the powertrain control module and a service technician's powertrain control module diagnostic tool.

9. The engine diagnostic system of claim 6, wherein the test is selected from the group consisting of an open loop position test, a throttle step response test, a stop position repeatability test, a stop compliance test, a positional noise test, a current sense test, an H-bridge enable test, a hysteresis test, a current limit test, a motor resistance check, a sweep test, a range of motion test, a spring/motor force test, a test for positional noise, a test for high friction, a test for ice formation, a throttle-stuck test, and a timing test.

10. The engine diagnostic system of claim 9, wherein the timing test is selected from the group consisting of a delay time, a rise time, a settling time, and a throttle return timing test.

11. The engine diagnostic system of claim 6, wherein the at least one test is an open loop position test in which a terminal voltage and a corrected voltage are calculated for a plurality of points, and a result of the test is determined by multiplying a first array of closing results of the throttle with a second array of opening results of the throttle, and comparing said results to a standard.

12. An electronic throttle diagnostic system, comprising:

an electronic throttle for an internal combustion engine;

a powertrain control module operably connected with the electronic throttle, the powertrain control module further comprising a memory with a software program for conducting diagnostic tests on the electronic throttle;

at least one sensor for indicating a parameter of the electronic throttle, wherein the powertrain control module performs at least one test of at least one parameter of the electronic throttle when the throttle is off-line; and an output for outputting at least one result of the test.

13. The electronic throttle diagnostic system of claim 12, wherein the throttle is off-line during at least one of a production period, a power-down period, a period of low throttle pressure drop, and a period when the engine is off.

14. The electronic throttle diagnostic system of claim 12, further comprising a memory containing a software program for conducting the at least one test, the memory operably connected to at least one of the powertrain control module and a service technician's powertrain control module diagnostic tool.

15. The electronic throttle diagnostic system of claim 12, wherein the test is selected from the group consisting of an open loop position test, a throttle step response test, a stop position repeatability test, a stop compliance test, a positional noise test, a current sense test, an H-bridge enable test, a hysteresis test, a current limit test, a motor resistance check, a sweep test, a range of motion test, a spring/motor force test, a test for positional noise, a test for high friction, a test for ice formation, a throttle-stuck test, and a throttle return timing test.

16. A method of diagnosing off-line an electronic throttle connected to a powertrain control module of an internal combustion engine, the method comprising:

waiting for a period of time when the electronic throttle is off-line;

testing the electronic throttle for at least one parameter of performance of the electronic throttle; and outputting at least one result of the test.

17. The method of claim 16, further comprising reading an indicator of performance from a sensor operably connected to the electronic throttle.

18. The method of claim 16, further comprising comparing an indicator of performance from a sensor operably connected to the electronic throttle to a standard of performance.

* * * * *